No. 670,035. Patented Mar. 19, 1901.
C. H. SAWYER.
COMBINED NUT AND HOOK.
(Application filed July 21, 1900.)

(No Model.)

WITNESSES:
Phil. Brown
James A. Lucas

INVENTOR
Chas H. Sawyer
BY
Emil Starek
ATTORNEY.

UNITED STATES PATENT OFFICE.

CHARLES H. SAWYER, OF ST. LOUIS, MISSOURI, ASSIGNOR TO IMPLEMENT, WOOD STOCK AND MANUFACTURING CO., OF SAME PLACE.

COMBINED NUT AND HOOK.

SPECIFICATION forming part of Letters Patent No. 670,035, dated March 19, 1901.

Application filed July 21, 1900. Serial No. 24,441. (No model.)

*To all whom it may concern:*

Be it known that I, CHARLES H. SAWYER, a citizen of the United States, residing at St. Louis, State of Missouri, have invented certain new and useful Improvements in a Combined Nut and Hook, of which the following is a full, clear, and exact description, reference being had to the accompanying drawings, forming a part hereof.

My invention has relation to improvements in combined nuts and hooks; and it consists in the novel construction of an article of manufacture, more fully set forth in the specification and pointed out in the claims.

Figure 1:
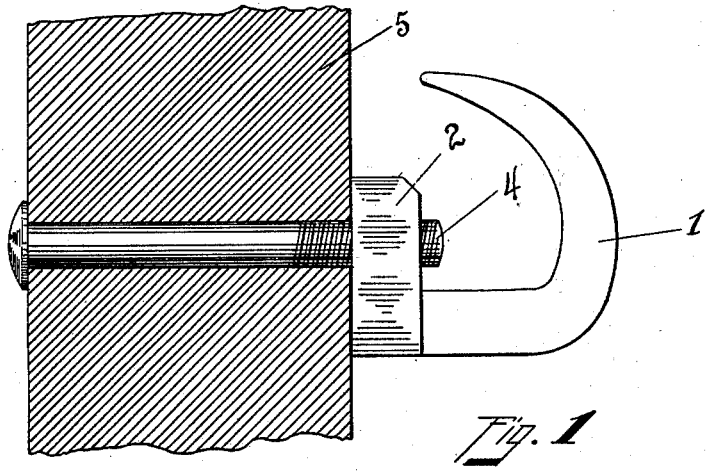
Figure 2:
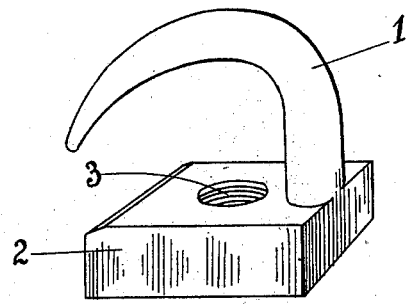
Figure 3:
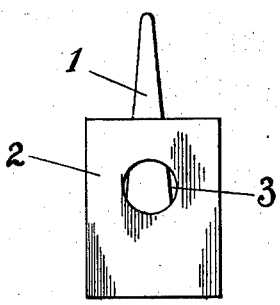
Figure 4:
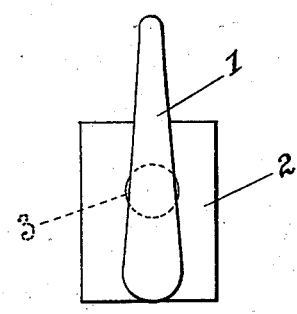

In the drawings, Figure 1 is a side view of the combined nut and hook, showing the same secured to a section of a beam or other support. Fig. 2 is a perspective view of the device detached. Fig. 3 is a bottom plan, and Fig. 4 is a top plan, thereof.

The object of my invention is to construct a coupling nut and hook for singletrees, neckyokes, traces, or, in fact, for any purpose whatsoever, the nut portion of the present device taking the place of the prevailing clip by which the hook is generally secured to the part carrying the same. For example, in the case of a combination of double and single trees the hook connecting the several trees is generally coupled to a clip carried by one of the trees, or, in the case of neck-yokes, the hook is coupled to a ring carried by the pole. By my present device the clip is omitted entirely, thereby cheapening and simplifying the resulting article of manufacture. In cases where the free end of the hook is brought into the plane of the basal surface of the nut, so that the nut (when passed over the screw-threaded portion of the securing-bolt) and such free end of the hook bear against the beam through which the bolt is passed the parts will virtually form a ring which may serve the various purposes of any ordinary ring.

In detail the device may be described as follows:

Referring to the drawings, 1 represents a hook, the base of which projects substantially at right angles from the end of the upper face of the nut 2, the outer peripheral wall of the hook being substantially a continuation of the adjacent end wall of the nut, the free end of the hook being brought a suitable distance beyond the opposite end wall of the nut. The nut is provided with a screw-threaded opening 3, adapted to be passed over the screw-threaded end 4 of a securing-bolt passed through a beam 5 or other supporting member. The portion 2, while thus serving as a nut for the bolt, serves as a means for carrying the hook, which thus forms an integral part thereof. If the end of the hook be brought down to meet the surface of the timber 5, it is apparent that the hook 1, nut 2, and so much of the surface of the beam 5 as would be included between the nut and end of hook would form a complete inclosure or ring which would serve all the purposes of a ring.

It is apparent that the combined nut and hook as an article of manufacture can be used for an infinite variety of purposes.

I do not, of course, limit myself to the precise curvature of the hook, and, in fact, the free end of the said hook might be brought into actual contact with the adjacent end of the nut, thereby converting such hook, with its nut, into a closed ring; nor do I limit myself to the shape of the nut or to the number of hooks carried thereby.

Having described my invention, what I claim is—

1. As an article of manufacture, a nut having a hook carried thereby and curved over the face of the nut, substantially as set forth.

2. As an article of manufacture a nut having a hook formed integrally therewith and curved over the face of the nut, substantially as set forth.

3. As an article of manufacture a nut having a screw-threaded opening, a hook formed integrally with the nut and projecting substantially at right angles from the upper face thereof, the base of the hook forming a continuation of the adjacent end wall of the nut, and the free end of the hook being curved over the face of the nut and brought a suitable distance beyond the opposite end wall of the nut, substantially as set forth.

In testimony whereof I affix my signature in presence of two witnesses.

CHARLES H. SAWYER.

Witnesses:
 EMIL STAREK,
 G. L. BELFRY.